United States Patent [19]

Derrien et al.

[11] Patent Number: 5,362,015

[45] Date of Patent: Nov. 8, 1994

[54] DEVICE FOR STEERING THE WHEELS AT THE BOTTOM END OF AN AIRCRAFT LANDING GEAR LEG

[75] Inventors: Michel Derrien, Versailles; Philippe Brisedou, Fresnes, both of France

[73] Assignee: Messier-Bugatti, Velizy-Villacoublay, France

[21] Appl. No.: 135,962

[22] Filed: Oct. 14, 1993

[30] Foreign Application Priority Data

Oct. 16, 1992 [FR]  France ................................ 92 12417

[51] Int. Cl.⁵ .......................................... B64C 25/50
[52] U.S. Cl. ..................................................... 244/50
[58] Field of Search ............... 244/50, 100 R; 280/93, 280/95.1, 846, 270

[56] References Cited

U.S. PATENT DOCUMENTS

| | | | |
|---|---|---|---|
| 2,279,074 | 4/1942 | Stearman | 244/50 |
| 2,424,233 | 7/1947 | Greenough | 244/50 |
| 2,550,137 | 4/1951 | Corns . | |
| 2,943,498 | 7/1960 | Smith | 244/50 |
| 3,904,153 | 9/1975 | Watts . | |
| 4,948,069 | 8/1990 | Veaux et al. | 244/50 |

FOREIGN PATENT DOCUMENTS 1068671  6/1954  France ................. 244/50

*Primary Examiner*—Galen L. Barefoot
*Attorney, Agent, or Firm*—Sixbey, Friedman, Leedom & Ferguson

[57] ABSTRACT

The strut of the leg has a lateral extension on its outside above the rotary sleeve, the cylinder of a steering actuator is suspended from the lateral extension by means of a universal joint, the end of the rod off said actuator is hinged to a lateral steering lug of the rotary sleeve. This flexible disposition puts fewer constraints on implementation of the scissor linkage, and it improves guidance of the rotary sleeve.

6 Claims, 1 Drawing Sheet

U.S. Patent     Nov. 8, 1994     5,362,015
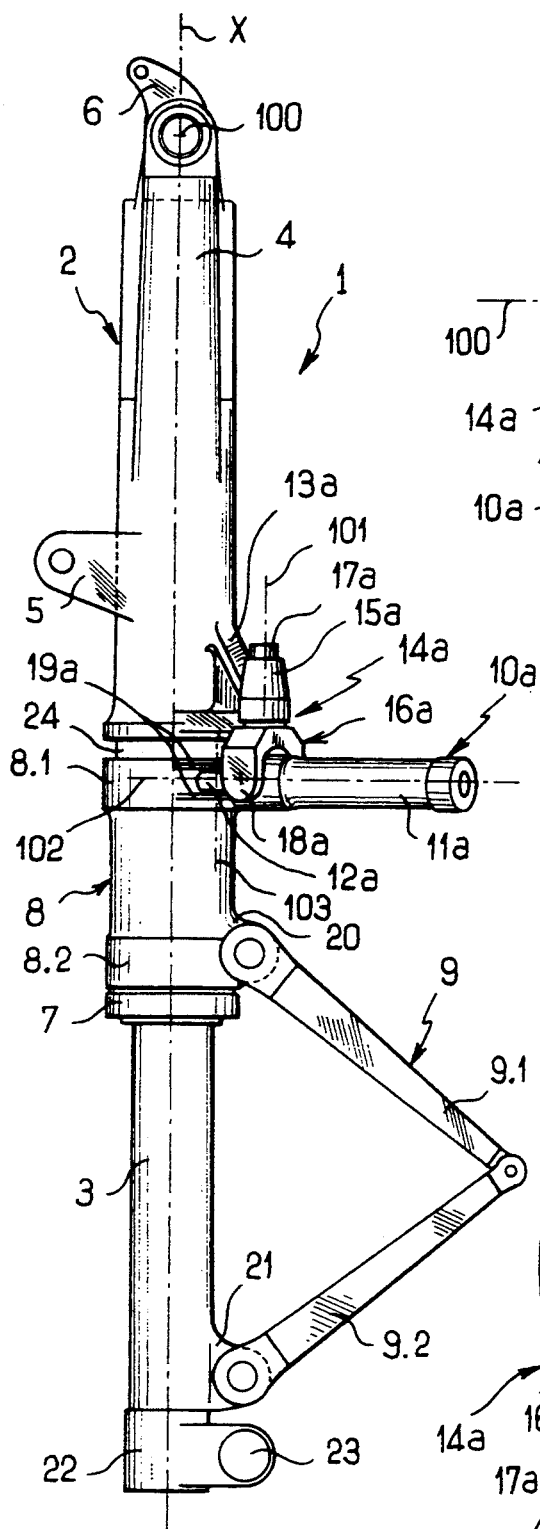
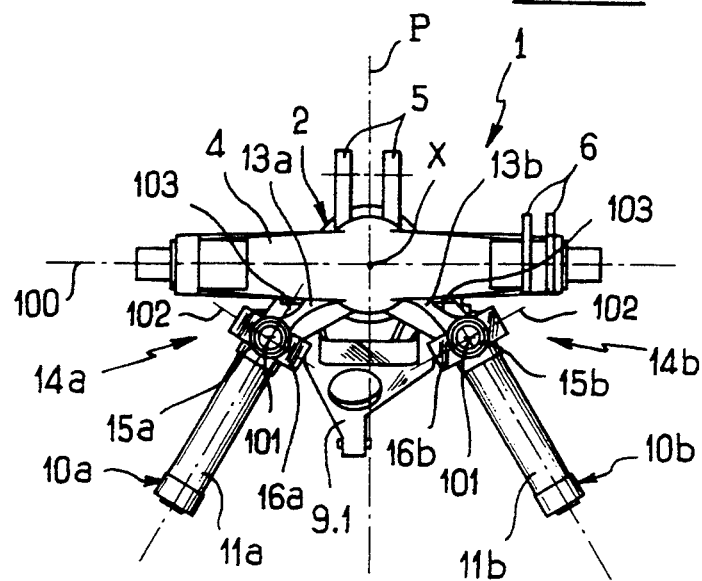
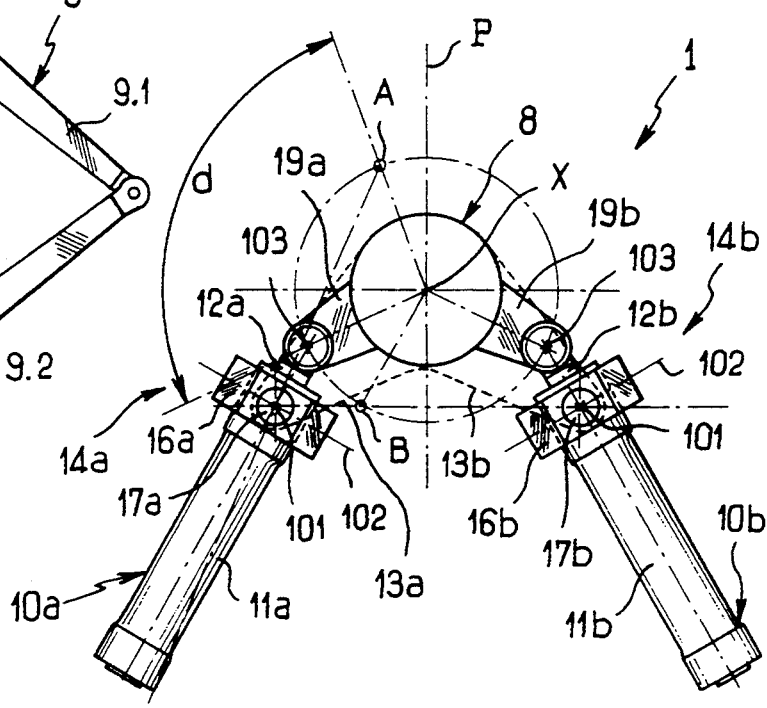

DEVICE FOR STEERING THE WHEELS AT THE BOTTOM END OF AN AIRCRAFT LANDING GEAR LEG

The present invention relates to a device for steering the wheel set carried by aircraft landing gear about the axis of said landing gear.

BACKGROUND OF THE INVENTION

While an aircraft is taxiing, it is generally steered by the wheel set carried by the nose (or auxiliary) landing gear, and fitted to the bottom end of the telescopic leg of said landing gear. Steering by means of this wheel set thus requires the end rod of said leg to be drivable in rotation about its own axis, which rod is also axially slidable relative to a strut that contains, amongst other things, a shock absorber.

Landing gear is usually constituted by a leg essentially comprising a tubular strut hinged to the structure of the aircraft (which structure is the part that is driven to retract or extend the landing gear, and has landing gear drive members, side-brace members, and locking members coupled thereto), and a rod that slides axially inside the strut (said rod carrying the axle of the wheel set and co-operating with the shock absorber that is housed inside the strut).

It is thus possible to use landing gear in which the strut is not merely a force-transferring member, but serves also to contribute to guiding and shock absorbing functions for the rod which slides directly inside the strut.

In this case, a sleeve is provided mounted to rotate on the outside of the strut, the sleeve being connected by means of a scissor linkage to the bottom end of the sliding rod.

To rotate the rod about its axis, the mechanism normally implemented includes at least a steering actuator disposed transversely to the axis of the leg, which actuator has its cylinder hinged to the strut and its rod hinged to the rotary sleeve. For example, the state of the art is illustrated in the following documents: GB-A-901 836 and US-A-2 930 547.

The cylinder of the, or each, actuator is thus disposed between two parallel plates that project laterally from the strut in order to obtain a hinge for said cylinder about an axis parallel to the axis of the leg. The rotary sleeve is then necessarily disposed between the top plate(s) and the bottom plate(s), which puts a de facto limit on the height of said rotary sleeve, which sleeve is consequently implemented in the form of a cylindrical collar.

Under such circumstances, that arrangement can be considered to be restrictive insofar as the rotary sleeve runs the risk of being poorly guided (because of its limited height) and because the scissor linkage must be relatively long, thereby, de facto reducing its stiffness, and making the telescopic leg more sensitive to vibration. In addition, safety considerations cause manufacturers to dispose the scissor linkage in such a manner that its top branch is horizontal when the landing gear leg is under static load, and as a result the two branches of the scissor linkage are generally of different lengths.

OBJECTS AND SUMMARY OF THE INVENTION

The invention seeks specifically to solve that problem by designing a steering system of higher performance.

An object of the invention is thus to provide a device for steering the wheels about the axis of the leg, which device is both efficient and structurally simple, while also putting fewer constraints on the surrounding components (in particular the scissor linkage) because of greater flexibility in the face of deformation of the leg.

More particularly, the invention provides a device for steering the wheels fitted to the bottom end of an aircraft landing gear leg, said leg comprising a strut hinged to the structure of the aircraft and a rod axially slidable inside the strut, and also including a sleeve mounted to rotate on the outside of the strut and connected by a scissor linkage to the bottom end of the sliding rod, said device including at least one steering actuator disposed transversely to the axis of the leg, the cylinder of the actuator being hinged to the strut, and the rod of the actuator being hinged to the rotary sleeve, wherein the strut has a lateral extension on its outside above the rotary sleeve, the cylinder of the steering actuator being suspended from the lateral extension by means of a universal joint, and the rod of said actuator being hinged at its end to a lateral steering lug of the rotary sleeve.

In a particular embodiment, the lateral extension is terminated by an outwardly offset sleeve whose axis is parallel to the axis of the leg, and in which a fork swivels, the cylinder of the steering actuator being hinged between the tines of the fork to oscillate freely about an axis that remains in a plane perpendicular to the axis of the leg. More particularly, the lateral lug of the rotary sleeve is defined by two adjacent plates between which the end of the rod of the steering actuator is hinged.

It is also advantageous for the steering device of the invention to include two steering actuators disposed symmetrically about a midplane containing the axis of the leg when the associated wheels are in a neutral position. It is then preferable for the two lateral extensions of the strut to be disposed symmetrically about said midplane and to be fitted with identical universal joints, and for the two lateral lugs of the rotary sleeve to be symmetrical to each other about said midplane when the wheels are in the neutral position.

It is also advantageous for the rotary sleeve to be in the form of an elongate tube whose top portion carries the lateral lug(s), and whose bottom portion carries a projecting appendix to which the top branch of the scissor linkage is hinged.

Also preferably, the lateral extension(s) is/are integral with the strut, preferably being integrally molded therewith during manufacture of said strut.

BRIEF DESCRIPTION OF THE DRAWING

Other characteristics and advantages of the invention appear more clearly in the light of the following description and the accompanying drawing, relating to a particular embodiment and given with reference to the figures, in which:

FIG. 1 shows a landing gear leg fitted with a steering device of the invention, said leg being shown in its relaxed position;

FIG. 2 is a plan view of the above-mentioned leg, showing more clearly how the two actuators are disposed in accordance with the invention; and FIG. 3 is a diagram similar to FIG. 2, showing more clearly the steering angle obtained.

MORE DETAILED DESCRIPTION

FIGS. 1 and 2 show a landing gear leg 1 comprising a strut 2 and a rod 3 that is slidable axially inside the strut. In conventional manner, the strut has branches 4 at its top end enabling it to be hinged about an axis 100 to the structure of the aircraft (not shown herein), and the strut also includes projecting appendices 5 and 6 for connection to drive members and side-brace members associated with lowering or raising the landing gear.

The axis of the telescopic leg 1 is referenced X, and the sliding rod 3 slides directly inside the strut 2. The rod has a bottom end 22 provided with an appendix 23 associated with receiving the axle of a wheel set that is not shown herein.

A sleeve 8 that is rotatably mounted on the outside of the strut 2 is also provided, said sleeve being connected by a scissor linkage 9 to the bottom end of the sliding rod 3. The rotary sleeve 8 is constituted, in this case, by an elongate tube, and it is specifically this feature that is made possible by the particular disposition of the steering mechanism of the invention, which disposition is described below.

The steering device of the invention includes at least one steering actuator disposed transversely to the axis of the leg, which actuator has its cylinder hinged to the strut and its rod to the rotary sleeve. In this example, the device includes two steering actuators, but that is merely by way of example and the corresponding references are given respective indices a or b.

In accordance with a characteristic of the invention, the strut 2 has a lateral extension 13a on the outside above the rotary sleeve 8, from which extension the steering actuator 10a is suspended by means of a universal joint 14a, the rod of said actuator being in turn hinged at its end to a lateral steering lug 19a of the rotary sleeve.

The steering actuator 10a thus comprises a cylinder 11a which is suspended from the lateral extension 13a by a universal joint 14a, and a rod 12a which is hinged at its end to the lateral lug 19a which is constituted in this case by two adjacent plates between which the end of the rod 12a of the steering actuator is received, as in a clevis.

In this case, the lateral extension 13a of the strut 2 is in the form of a top slab and a bottom slab which are interconnected by a central web, said extension being terminated by an outwardly offset sleeve 15a whose axis 101 is parallel to the axis X of the leg. This offset sleeve 15a, serves to secure a rotary fork or "swivel" 16a to which the cylinder 11a of the steering actuator is hinged. There can be seen a fork 16a surmounted by a central pin 17a that is received in the sleeve 15a so as to leave the fork free to swivel about the axis 101, said fork having two symmetrical tines 18a between which the cylinder 11a of the steering actuator 10a is hinged, thus allowing it to oscillate freely about an axis 102 that remains in a plane perpendicular to the axis X of the leg.

This disposition thus obtains an additional degree of freedom for the actuator cylinder, thereby making it possible to have a flexible mounting capable of following deformation of the leg without significant interference forces being exerted on the steering actuator.

This makes it possible to eliminate the bottom plate that has previously been used to organize the hinge between the strut and the cylinder of the steering actuator, thereby making it possible to extend the rotary sleeve downwards, and to implement the sleeve in the form of an assembly that is elongate and that is therefore naturally better guided. The sleeve 8 is thus in "the form of an elongate tube whose top portion 8.1 has the lateral lug 19a and whose bottom portion 8.2 has a projection appendix 20 used for implementing a hinged connection with the top branch 9.1 of the scissor linkage 9 whose bottom branch 9.2 is hinged to a projecting appendix 21 disposed in the vicinity of the bottom end of the sliding rod 3. The rotary sleeve 8 is held between a bottom stop ring 7 secured to the strut 2 and a thrust ring 24 which, for example, may be sandwiched between the top edge of the rotary sleeve and a shoulder of the strut.

Because the vertical extent of the rotary sleeve 8 can be extended to improve guidance, there is naturally also a beneficial effect on the scissor linkage 9 insofar as there is much more freedom in the way in which the branches of the scissor linkage can be disposed. Since the appendix 20 is formed near the bottom end of the rotary sleeve 8, the necessary length for the scissor linkage is reduced, thereby improving its stiffness and transmission of steering torque to the sliding rod, such that the leg implemented in this way becomes less sensitive to vibration. In addition, it is now easy to avoid any possible constraint concerning the direction that the top leg of the scissor linkage might take up when the landing gear leg is under static load: because of the improved guidance of the rotary sleeve, it is no longer necessary for the branch 9.1 to be horizontal when the landing gear leg is under static load, and it is then advantageous to provide for the linkage 9 to be constituted by two identical branches 9.1 and 9.2, as shown herein.

In particular, provision is made for the steering device to include two actuators, each having its cylinder hinged to the strut and having its rod hinged to the rotary sleeve, as can be seen more clearly in FIGS. 2 and 3.

There can thus be seen two steering actuators 10a and 10b which are disposed symmetrically about a midplane P containing the axis X of the leg when the associated wheels are in a neutral position, which is the position illustrated in FIGS. 2 and 3. The strut 2 includes two lateral extensions 13a and 13b which are disposed symmetrically about said midplane P, and which are fitted in this case with identical universal joints 14a and 14b, but that is merely an advantageous example. The hinge components associated with the steering actuator 10b are identical to those described above for the actuator 10a, so there is no point in describing them again. The strut 2 is thus fitted with two lateral extensions 13a and 13b, each of which is terminated by an offset sleeve 15a or 15b, having its axis 101 parallel to the axis X of the leg, and in which an associated fork 16a or 16b swivels. It is naturally advantageous for the two lateral lugs 19a and 19b of the rotary sleeve 8 to be symmetrical to each other about the midplane P when the wheels are in the neutral position, as shown in FIG. 3.

In addition, the lateral extensions 13a and 13b are preferably integral with the strut 2, for example being integrally molded therewith during manufacture of said strut, which may be made of aluminum, for example. The steering mechanism is then extremely easy to assemble since it suffices to install each swivelling fork to which a steering actuator is hinged.

In FIG. 3, dashed lines show the bottom slabs of the extensions 13a and 13b, while continuous lines show the lateral lugs 19a and 19b of the sleeve 8 associated with each of the two steering actuators 10a and 10b. When the sliding rod and the associated wheel set is to be swivelled in one direction or the other, the chambers of the two actuators 10a and 10b are fed in such a manner that the drive from the two actuators is combined over the entire angular range of steering. For clockwise rotation, the thrust point 103 corresponding to the hinge axis at the end of the rod of actuator 10a describes an arc of a circle to point A, which corresponds to a steering angle d whose value is slightly greater than 90° in this case. In this position, the axis 103 associated with the hinge of the rod of the other actuator 10b comes to point B that is situated on the same circular path. The wheel set can naturally be swivelled in the opposite direction symmetrically to the motion described above.

A device has thus been provided for steering wheels about the axis of the leg where the device is simultaneously efficient and simple in structure, while also putting fewer constraints on the surrounding components, in particular the scissor linkage because it is more flexible with respect to deformation of the leg. In addition, the structure of the device makes it possible to obtain a rotary sleeve of considerable length, which is therefore well guided on the strut, and having the universal joints cantilevered out makes it possible to accept deformation of the leg without transmitting parasitic forces to the steering actuators.

The invention is not limited to the embodiment described above, but on the contrary extends to any variant that uses equivalent means to reproduce the essential characteristics specified above.

We claim:

1. A device for steering the wheels fitted to the bottom end of an aircraft landing gear leg, said leg comprising a strut hinged to the structure of the aircraft and a rod axially slidable inside the strut along a longitudinal axis of said leg, and also including a sleeve mounted to rotate on the outside of the strut and connected by a scissor linkage to the bottom end of the sliding rod, said device including at least one steering actuator disposed transversely to the axis of the leg, the cylinder of the actuator being hinged to the strut, and the rod of the actuator being hinged to the rotary sleeve, wherein the strut has a lateral extension on its outside above the rotary sleeve, the cylinder of the steering actuator being suspended from the lateral extension by means of a universal joint, so as to be able to pivot about a first axis and a second axis perpendicular thereto; and the rod of said actuator being hinged at its end to a lateral steering lug of the rotary sleeve and wherein the lateral extension is terminated by an outwardly offset sleeve whose axis is parallel to the axis of the leg and constitutes the first axis of said universal joint, and in which freely swivels a fork having two spaced tines and arranged under said sleeve, the cylinder of the steering actuator being hinged between the tines of the fork to oscillate freely about an axis that remains in a plane perpendicular to the axis of the leg and which constitutes the second axis of said universal joint.

2. A device according to claim 1, wherein the lateral lug of the rotary sleeve is defined by two adjacent plates between which the end of the rod of the steering actuator is hinged.

3. A device according to claim 1, including two steering actuators disposed symmetrically about a midplane containing the axis of the leg when the associated wheels are in a neutral position.

4. A device according to claim 3, wherein the two lateral extensions of the strut are disposed symmetrically about said midplane and are fitted with identical universal joints, and the two lateral lugs of the rotary sleeve are symmetrical to each other about said midplane when the wheels are in the neutral position.

5. A device according to claim 1, wherein the rotary sleeve is in the form of an elongate tube whose top portion carries the lateral lug(s), and whose bottom portion carries a projecting appendix to which the top branch of the scissor linkage is hinged.

6. A device according to claim 1, wherein the lateral extension(s) is/are integral with the strut, preferably being integrally molded therewith during manufacture of said strut.

* * * * *